April 26, 1966 D. J. FARMER 3,248,666
OPTICALLY PUMPED COMBINATION GAS CELL AND
MICROWAVE RESONATING CAVITY
Filed March 12, 1963
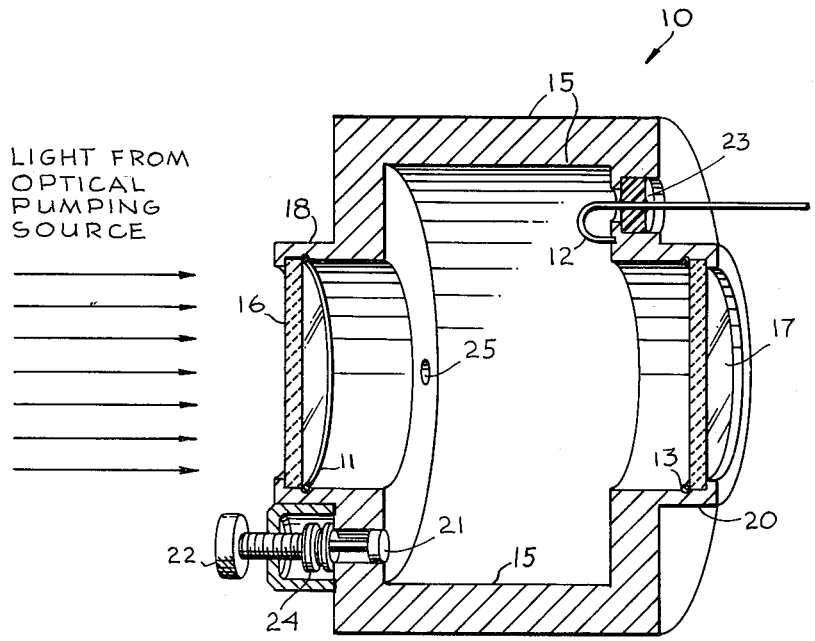
DONALD J. FARMER
INVENTOR.
BY Fraser and Bogucki
ATTORNEYS

United States Patent Office 3,248,666
Patented Apr. 26, 1966

3,248,666
OPTICALLY PUMPED COMBINATION GAS CELL AND MICROWAVE RESONATING CAVITY
Donald J. Farmer, Pacific Palisades, Calif., assignor, by mesne assignments, to GTC Corporation, a corporation of Texas
Filed Mar. 12, 1963, Ser. No. 264,679
12 Claims. (Cl. 331—94)

This invention relates generally to resonant cavities for microwave electromagnetic energy and is particularly directed to a combination resonant cavity and gas cell such as is used in optically pumped quantum systems.

Systems in which atoms are acted upon by electromagnetic radiation at two or more frequencies to provide a useful result, such as the so-called gaseous masers and certain atomic frequency standards, generally employ a gas cell contained within a resonant microwave cavity. In a rubidium gas cell frequency standard, for example, a microwave resonance in the rubidium is detected by measuring the absorption of suitable optical radiation which is directed at the gas cell while the resonant cavity is excited by an external generator. The frequency of this generator is controlled according to the degree of absorption of the optical radiation. In this manner the generator is rendered extremely stable in frequency and is useful as a basic frequency standard.

In masers as well, that is, devices which achieve microwave amplification by the stimulated emission of radiation, use is made of the interaction between microwave energy and optical radiation. While the mechanics of operation may be somewhat different for atomic frequency standards and masers, both depend upon such interaction and upon the principle of optical pumping.

In devices of the type described, the efficiency of operation and, indeed, in some cases, the question of whether operation is possible at all depend on the microwave Q obtainable in a particular gas cell and microwave resonator combination. This follows from the fact that the extent of interaction between the atoms and the microwave radiation depends on the intensity of the radiation field, which intensity is proportional to $\sqrt{QP}$, where P is the microwave input power. It is generally desirable to obtain as large a radiation field intensity as possible from a limited input power; thus, arrangements yielding a higher Q are useful. In fact, for some devices in the category described, notably the gaseous maser oscillator, a very high Q, which is larger than that obtainable with previously known arrangements, is necessary in order to achieve operation.

In atomic frequency standards and gaseous masers of the type described, a preferred type utilizes rubidium vapor in the gas cell at which the optical radiation is directed. It is possible, however, to utilize other alkali metals, such as sodium or cesium, in lieu of rubidium. However, it is well known that such alkali metals, including rubidium, are extremely active chemically and readily form chemical compounds with most metals. In previously known arrangements, the generally corrosive alkali metal vapor, such as rubidium, is disposed in a glass container which is centrally located within its associated resonant microwave cavity. However, in such an arrangement the effective Q of the overall device is limited by electrical losses in the glass material.

Quartz is known to cause less loss than glass and for this reason has been used in place of glass as the envelope of a gas cell within the microwave cavity. Despite the higher Q which is obtainable with such an arrangement, there are other factors which are introduced that serve to prevent such an arrangement from operating in a completely satisfactory manner. For example, it has been found with both glass and quartz that the alkali metal may deposit in a thin electrically conducting layer over the interior of the gas cell and that electrical losses in this layer seriously lower the Q.

A further disadvantage with presently employed arrangements stems from the use of separate gas cell and microwave cavity structures. In such arrangements, the dimensional variation from one gas cell to another, which inherently results from the inability to fabricate such glass or quartz structures to sufficiently close tolerances, necessitates a special tuning procedure whenever a gas cell is replaced in a particular microwave cavity.

It is therefore an object of the present invention to provide an improved microwave resonator for gaseous optically pumped quantum systems.

It is a more specific object of the present invention to provide a resonant cavity structure for an optically pumped device which exhibits a high Q at operating frequencies.

Another object of the present invention is to provide a resonant cavity for optically pumped devices which may be readily fabricated and which is stable in operation at a selected frequency.

The invention makes use of the observed fact that those alkali metals such as sodium, rubidium and cesium which are suitable for use in the devices described above do not form alloys or chemical compounds with either pure copper or pure silver. Despite this fact, it may be pointed out that rubidium vapor is ordinarily extremely corrosive to most metals and will attack, for example, such noble metals as gold and platinum.

Accordingly, in accordance with the present invention there is provided, for use in an optically pumped device, a resonant cavity which is designed to retain a gaseous atmosphere. The gaseous atmosphere includes as an active element an alkali metal vapor, such as rubidium, for example. The resonant cavity is made of a metal which does not chemically react with the alkali metal. As pointed out before, such metals may be pure copper or pure silver, either of which is a good electrical conductor, readily available, and thus suitable for the material of the microwave cavity as well as the enclosure of the gas cell. The cavity is then provided with at least one window for admitting electromagnetic waves of a frequency suitable for optically pumping the alkali metal vapor. Generally, the electromagnetic waves will be monochromatic light. In the use of the microwave resonator in an atomic frequency standard it is feasible to provide a second window to let the optical radiation pass completely through the resonant cavity. Since the cavity now consists essentially of metal, it is easy to extract microwave energy from the cavity in any conventional manner, so that the usual loop pickup may be employed. The resonator may be readily tunable by the use of an adjustable element extending through the resonator wall and in threaded engagement therewith.

The invention may be better understood from the following detailed description when read in connection with the accompanying drawing, in which the single figure is a perspective view in cross-section of a particular resonant cavity in accordance with the invention for use in an optically pumped device.

Referring now to the drawing, there is illustrated in a sectioned perspective view a particular arrangement of a microwave resonator 10 in accordance with the invention for use in a rubidium frequency standard. The microwave resonator 10 is in the form of a cavity of appropriate dimensions for resonating at a desired microwave frequency and is arranged, in accordance with the invention, in a sealed configuration for containing a suitable gas or vapor within the cavity. In accordance with this aspect of the invention, the walls 15 of the microwave resonator 10 are fabricated of a metal which is immune to chemical attack by the gas or vapor inside the cavity. Thus, for example, where the active element of the enclosed gas is rubidium, the walls 15 of the resonant cavity 10 may be made either of pure silver or pure copper. Both copper and silver are excellent conductors of electricity and hence are well adapted to serve as the walls of the resonant cavity. In addition, the immunity of copper and silver to chemical reaction with the corrosive vapors of rubidium or other alkali metals which may be employed in a gaseous maser or atomic frequency standard renders these materials particularly suitable for the purpose descrbied. In addition to the active alkali metal vapor within the cavity of the resonator 10, the cavity may contain certain chemically inert noble gases as a buffer. While it is considered preferable to fabricate the resonator 10 with the walls 15 being either of copper or silver, alternative suitable arrangements may be provided by fabricating a structure of some other metal and plating or otherwise cladding the inner surface with either copper or silver at all points which are in contact with the contained alkali metal vapor.

By way of example, the cavity of the resonator 10 may be cylindrical in cross-section and may have a length of approximately 1½ inches and a diamter of about 2½ inches. The wall thickness may be any desired dimension. Such a cylindrical cavity can be adjusted to resonate in the $TE_{011}$ mode at 6834 megacycles per second corresponding to the resonant frequency of $Rb^{87}$.

Preferably two windows 16 and 17 are provided in the opposite end walls of the resonator 10. In one particular embodiment the windows 16 and 17 are fabricated of quartz, but they may also be made of glass if desired. In any case, they should be transparent to the optical radiation which is directed at the device as indicated at the left of the figure. Preferably the windows 16 and 17 are mounted on cylindrical extensions 18 and 20. If the windows 16, 17 are of glass, they may be sealed to the resonator 10 by glass-to-metal seals using fusable rings attached to the cylindrical extensions 18, 20. In the described arrangement in which the windows 16, 17 are quartz, they may be sealed to the cylindrical extensions 18, 20 through the use of metal gaskets 11 and 13 in the general shape of an O-ring consisting of silver or copper. In such an arrangement the reduced pressure inside the resonant cavity enables atmospheric pressure to hold the windows 16 and 17 sealed against the gaskets 11 and 13. In this arrangement, the oppositely disposed windows 16, 17 permit optical radiation to pass through the cavity. A coupling loop 12 is shown extending within the interior of the cavity and suitably oriented to couple microwave energy with the desired mode. The lead of the coupling loop 12 may be sealed in a suitable insulator 23 disposed in one of the cavity walls. The coupling loop 12 may be connected to a suitable generator or utilization device (not shown). One or more sealing tubes such as 25 may be used to evacuate the cavity or to admit gases or vapors during manufacture of the device. The sealing tube may then be closed to maintain the composition of the contained gas constant without contamination. In order to provide a fine tuning adjustment of the frequency of operation, principally for use during the initial frequency alignment of the system, a tuning element such as that indicated at 21 may be disposed in a sealing relationship in one of the walls 15 of the resonator 10. The tuning element 21 may be moved in or out of the cavity of the resonator 10 under the control of a tuning screw 22 bearing on the element 21 through a bellows 24 to control the resonant frequency of the resonator 10 for a limited frequency range.

Using the described structure in accordance with the present invention, a particularly desirable arrangement of a microwave resonator is provided. In fabrication, the dimensions of the resonator cavity may be closely controlled to correspond to the design parameters of the selected opearting frequency without need to compensate for variations introduced by the latter addition of a separate gas cell, as is the case in presently known prior art arrangements. When the device is put in operation, the fine tuning adjustment may be set to produce resonance at the operating frequency and no further adjustment need be made, a result which is a considerable improvement over presently known prior arrangements which require tuning of the cavity each time the associated gas cell is moved or replaced therein. The microwave resonator in accordance with the invention advantageously achieves a significant increase in the effective Q of the device over similar prior art arrangements. Thus for a given level of power, a considerably greater field intensity is obtainable with attendant improvement of operation or, conversely, a desired level of field intensity may be provided at a substantial reduction in power level. This desirable improvement in operation presented by the structure of the invention is achieved without the undesirable effects which are presently encountered in certain prior art arrangements. It will be observed that coupling of microwave energy into or out of the cavity is easily accomplished by means of a simple pickup loop. It should further be noted that the windows 16, 17 which are added to the structure for operation in an optically pumped quantum system are readily sealed to the resonator 10 without danger of the corrosion of the seals by the enclosed vapor.

Although a particular arrangement of the invention has been shown and described in the context of use in a rubidium frequency standard, the principles and scope of the invention are not to be limited thereto. For example, the microwave resonator of the invention may be arranged with the coupling loop positioned in the cylinder wall for particular modes of operation. It is also possible to arrange the windows differently, as by locating them in the side walls or by providing a multiplicity of windows spaced about the cavity. Other modifications utilizing the principles of the invention may occur to those skilled in the art within the purview of the invention. Accordingly, any and all modifications, variations or equivalent arrangements falling within the scope of the annexed claims should be considered to be a part of the invention.

What is claimed is:

1. An optically pumped combination gas cell and microwave resonating cavity comprising a closed hollow cylinder having walls fabricated of an electrically conducting material which is immune to corrosion by alkali metal vapors, means for admitting incident radiant energy in the optical spectrum range through the end walls of the cavity, a microwave energy coupling element mounted on one wall of the cavity, and a contained gaseous atmosphere including as an active element an alkali metal vapor sealed within the cavity.

2. A gas cell in accordance with claim 1 wherein the material comprising the walls of the cavity is silver.

3. A gas cell in accordance with claim 1 wherein the material comprising the walls of the cavity is copper.

4. For use in a rubidium frequency standard, an optically pumped gas cell in the form of a microwave resonating cavity comprising a closed hollow cylinder having walls fabricated of an electrically conducting material which is immune to corrosion by alkali metal vapors, a microwave energy coupling element mounted in one end wall of the cavity, a contained gaseous atmosphere including as an active element an alkali metal vapor sealed within the cavity, and a pair of transparent windows mounted in opposite end walls of the cavity in alignment with each other.

5. An optically pumped gas cell in the form of a microwave resonating cavity comprising a hollow cylindrical portion terminated by a pair of opposite end walls, the material of the cavity walls comprising an electrically conducting material which is immune to attack by alkali metal, a contained gaseous atmosphere including as an active element an alkali metal vapor sealed within the cavity, means for admitting incident radiant energy in the optical spectrum range through the cavity end walls, and a conductive loop extending into the interior of the cavity through an end wall for coupling microwave energy.

6. For use in a gaseous manner, an optically pumped gas cell in the form of a microwave resonating cavity comprising a closed hollow cylinder having walls fabricated of an electrically conducting material which is immune to corrosion by alkali metal vapors, means for admitting incident radiant energy in the optical spectrum range through the walls of the cavity, a microwave energy coupling element hermetically mounted in one wall and extending into the cavity, a contained gaseous atmosphere including a particular alkali metal together with selected buffer gases sealed within the cavity, and an adjustable fine tuning element extending through the cavity wall for adjusting the resonant frequency thereof over a limited range.

7. A gas cell in accordance with claim 6 wherein the tuning element is positioned within a flexible bellows for movement by a threaded adjusting screw mounted on one end wall of the cavity.

8. A combination gas cell and microwave cavity for use in an optically pumped apparatus comprising a cavity resonant at a desired microwave frequency and having a hollow cylindrical portion terminating in two oppositely disposed end walls, the cavity having at least an inner surface comprising a metal which is immune to corrosion by alkali metal vapors, at least one optically transparent window affixed in the wall of the cavity in a hermetically sealing relationship, a gaseous atmosphere contained within the cavity including a selected alkali metal vapor as an active element, and means for coupling to microwave energy in the cavity.

9. A microwave resonating cavity for retaining a gaseous atmosphere including as an active element an alkali metal vapor, said cavity comprising a metal which is immune to chemical reaction with said alkali metal vapor, and a window in said cavity for admitting electromagnetic waves of a frequency for optically pumping said alkali metal vapor.

10. In an optically pumped apparatus, a resonant cavity for retaining a gaseous atmosphere including as an active element an alkali metal vapor, said resonant cavity having walls of a metal which does not chemically react with said alkali metal, a pair of windows in opposite walls of the cavity for transmitting electromagnetic waves of a frequency for optically pumping said alkali metal vapor, means for extracting microwave energy from the cavity, and adjustable tuning means extending through the cavity wall.

11. In an optically pumped apparatus, a microwave resonator disposed to receive substantially monochromatic light from a light source, said resonator being arranged to retain a gaseous atmosphere including rubidium as an active element, said resonator having walls of a metal selected from the group consisting of silver and copper, and a quartz window affixed within a wall of the cavity for admitting light from said source.

12. For use in an optically pumped gaseous device, a microwave resonator comprising a gaseous atmosphere within the resonator including as an active element an alkali metal vapor, said resonator having walls of a metal which is not subject to chemical reaction with said alkali metal, a pair of windows hermetically sealed in the walls of said cavity for admitting light waves of a frequency for optically pumping said alkali metal vapor and for permitting said light to pass through said resonator, means coupled to said resonator for connecting to a utilization device, and an adjustable tuning element affixed to a resonator wall.

References Cited by the Examiner
UNITED STATES PATENTS 3,038,126 6/1962 Robison _____ 331—3
3,165,705 1/1965 Dicke _____ 331—3

ROY LAKE, Primary Examiner.